(12) United States Patent
Xia

(10) Patent No.: US 10,601,666 B2
(45) Date of Patent: Mar. 24, 2020

(54) NETWORK FUNCTIONS VIRTUALIZATION MANAGEMENT AND ORCHESTRATION POLICY DESCRIPTOR MANAGEMENT METHOD AND APPARATUS

(71) Applicant: HUAWEI TECHNOLOGIES CO., LTD., Shenzhen, Guangdong (CN)

(72) Inventor: Haitao Xia, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/168,512

(22) Filed: Oct. 23, 2018

(65) Prior Publication Data

US 2019/0058636 A1    Feb. 21, 2019

Related U.S. Application Data

(63) Continuation of application No. PCT/CN2016/080516, filed on Apr. 28, 2016.

(51) Int. Cl.
*G06F 15/173* (2006.01)
*H04L 12/24* (2006.01)
(Continued)

(52) U.S. Cl.
CPC ........ *H04L 41/0893* (2013.01); *G06F 9/5077* (2013.01); *H04L 12/4641* (2013.01);
(Continued)

(58) Field of Classification Search
CPC .............. H04L 41/0893; H04L 41/046; H04L 41/5041; H04L 41/0803; H04L 12/4641; G06F 9/5077
See application file for complete search history.

(56) References Cited

U.S. PATENT DOCUMENTS 9,806,975 B2 * 10/2017 Xiang .................. G06F 9/5077
2015/0381423 A1 * 12/2015 Xiang ................ H04L 41/0893
709/223
(Continued)

FOREIGN PATENT DOCUMENTS

CN        103607305 A     2/2014
CN        104580293 A     4/2015
(Continued)

*Primary Examiner* — Richard G Keehn
(74) *Attorney, Agent, or Firm* — Womble Bond Dickinson (US) LLP

(57) ABSTRACT

An NFV MANO policy descriptor management method and an apparatus are disclosed. The method includes: receiving, by a policy rule execution entity, a network functions virtualization management and orchestration (NFV MANO) operation request sent by a policy rule decision entity, where the NFV MANO operation request includes a policy parameter; obtaining a policy descriptor file corresponding to the NFV MANO operation request, where the policy descriptor file includes at least one piece of policy information corresponding to an NFV MANO operation requested by the NFV MANO operation request; and configuring the policy parameter into the policy information to form a policy rule. Operational efficiency of NFV MANO policy management in the prior art is improved.

20 Claims, 3 Drawing Sheets

---

301 — A policy rule execution entity receives a network functions virtualization management and orchestration NFV MANO operation request sent by a policy rule decision entity 302 — The policy rule execution entity obtains a policy descriptor file corresponding to the NFV MANO operation request 303 — The policy rule execution entity configures a policy parameter into policy information to form a policy rule

(51) Int. Cl.
*H04L 12/46* (2006.01)
*G06F 9/50* (2006.01)

(52) U.S. Cl.
CPC ........ *H04L 41/046* (2013.01); *H04L 41/0803* (2013.01); *H04L 41/5041* (2013.01)

(56) References Cited

U.S. PATENT DOCUMENTS

| | | | |
|---|---|---|---|
| 2016/0269925 A1* | 9/2016 | Chou | H04W 28/0226 |
| 2017/0068559 A1* | 3/2017 | Lee | G06F 9/45558 |
| 2017/0141944 A1* | 5/2017 | Lee | H04L 41/04 |
| 2017/0214544 A1* | 7/2017 | Lin | H04L 12/46 |
| 2017/0222889 A1 | 8/2017 | Zong et al. | |
| 2018/0004576 A1* | 1/2018 | Gokurakuji | G06F 9/5077 |
| 2018/0191561 A1* | 7/2018 | You | H04L 41/5041 |
| 2018/0316730 A1* | 11/2018 | Schaefer | H04L 41/0893 |
| 2018/0351824 A1* | 12/2018 | Giust | G06F 9/542 |
| 2019/0052528 A1* | 2/2019 | Yoshimura | H04L 41/0813 |
| 2019/0058670 A1 | 2/2019 | Zhu et al. | |

FOREIGN PATENT DOCUMENTS

| | | |
|---|---|---|
| CN | 105282195 A | 1/2016 |
| EP | 3163843 A1 | 5/2017 |
| WO | 2015/143610 A1 | 10/2015 |
| WO | 2015196733 A1 | 12/2015 |
| WO | 2016045082 A1 | 3/2016 |

* cited by examiner

NETWORK FUNCTIONS VIRTUALIZATION MANAGEMENT AND ORCHESTRATION POLICY DESCRIPTOR MANAGEMENT METHOD AND APPARATUS

CROSS-REFERENCE TO RELATED APPLICATIONS

This application is a continuation of International Patent Application No. PCT/CN2016/080516, filed on Apr. 28, 2016. The disclosure of the aforementioned application is hereby incorporated by reference in the entity.

TECHNICAL FIELD

The present invention relates to the field of communications technologies, and in particular, to an NFV MANO policy descriptor management method and an apparatus.

BACKGROUND

Network functions virtualization (NFV) means that a telecommunication network operator implements some telecommunication network functions on a general-purpose cloud server, a switch, and a storage by using a virtualization technology in the IT field for reference. This technology requires that: the telecommunication network functions are implemented in a form of software, can be run on general-purpose server hardware, and can be migrated to, instantiated at, or deployed at different positions of a network without installation of a new device.

In an NFV management and orchestration (NFV MANO) architecture, a preconfigured policy related to a network service (NS) or a virtualized network function (VNF) is added to a network service descriptor (NSD) or a virtualized network function descriptor (VNFD). The policy is, for example, an auto-scaling rule or an affinity/anti-affinity rule. Application of an NFV MANO policy is based on a hypothesis that policies are independent of each other, and are not associated.

Based on an existing policy management function framework of MANO, to manage life cycles of thousands of or tens of thousands of VNF/NS instances and manage corresponding virtual resources, a MANO system needs to create and maintain a large quantity of policy rules. As a result, NFV MANO policy management efficiency cannot be improved.

SUMMARY

The present invention provides an NFV MANO policy descriptor management method and an apparatus. The method and the apparatus provided in the present invention resolve a prior-art problem that because a MANO system needs to create and maintain a large quantity of policy rules when performing an NFV MANO operation on a large quantity of NS instances or VNF instances, NFV MANO policy management has relatively high costs.

According to a first aspect, an NFV MANO policy descriptor management method is provided. The method includes:

receiving, by a policy rule execution entity, a network functions virtualization management and orchestration NFV MANO operation request sent by a policy rule decision entity, where the NFV MANO operation request includes a policy parameter;

obtaining, by the policy rule execution entity, a policy descriptor file corresponding to the NFV MANO operation request, where the policy descriptor file includes at least one piece of policy information corresponding to the NFV MANO operation request; and configuring, by the policy rule execution entity, the policy parameter into the policy information to form a policy rule.

In this implementation, the policy rule execution entity obtains the policy descriptor file corresponding to the NFV MANO operation request, and the policy rule execution entity configures the policy parameter in the operation request into the policy information through signaling interaction between the policy rule execution entity and the policy rule decision entity, to form the policy rule, so that maintenance of a large quantity of NFV MANO policies is avoided, thereby improving NFV MANO policy management efficiency.

With reference to the first aspect, in a first possible implementation, the policy information includes at least one of an event monitored according to the policy rule, a condition for executing the policy rule, and an action executed according to the policy rule.

In this implementation, normalization processing is performed on categories of NFV MANO operations by using the event monitored according to the policy rule, the condition for executing the policy rule, and the action executed according to the policy rule, so that classification management of policy rules is implemented, thereby further improving the NFV MANO policy management efficiency.

With reference to the first possible implementation of the first aspect, in a second possible implementation, the obtaining a policy descriptor file corresponding to the NFV MANO operation request includes:

determining, by the policy rule execution entity, an operational attribute of the NFV MANO operation requested by the NFV MANO operation request; and obtaining, by the policy rule execution entity from a catalog or from a set of policy descriptor files that is stored on the policy rule execution entity, the policy descriptor file corresponding to the operational attribute.

With reference to the first possible implementation of the first aspect, in a third possible implementation, the obtaining a policy descriptor file corresponding to the NFV MANO operation request includes:

obtaining, by the policy rule execution entity, an identifier of the policy descriptor file from the NFV MANO operation request; and obtaining, by the policy rule execution entity from a catalog, the policy descriptor file corresponding to the identifier of the policy descriptor file.

In the second and the third possible implementations of the first aspect, two manners of obtaining the policy descriptor file are provided, and according to the two manners, normalized policy descriptor file template processing may be performed based on the categories of the NFV MANO operations, so that classification management of the policy rules is implemented, thereby further improving the NFV MANO policy management efficiency.

With reference to any one of the first aspect or the first to the third possible implementations of the first aspect, in a fourth possible implementation, the configuring, by the policy rule execution entity, the policy parameter into the policy information to form a policy rule further includes:

receiving, by the policy rule execution entity, request information for updating the policy rule, where the request information includes the identifier of the policy descriptor file used by the policy rule and an updated policy parameter;

obtaining, by the policy rule execution entity according to the identifier of the policy descriptor file, the policy descriptor file used by the policy rule; and configuring, by the policy rule execution entity, the updated policy parameter into the policy descriptor file to form an updated policy rule.

In this implementation, one or more policy rules in the policy descriptor file may be dynamically updated, so that a policy rule updating and management procedure is simplified.

With reference to any one of the first aspect or the first to the fourth possible implementations of the first aspect, in a fifth possible implementation, the NFV MANO operation request includes at least one of: network service NS life cycle management, virtualized network function VNF life cycle management and virtual resource management, NS instantiation, NS updating, NS scaling, NS healing, NS termination, VNF instantiation, VNF updating, VNF scaling, VNF healing, VNF termination, virtual resource reservation, and virtual resource allocation.

With reference to any one of the first aspect or the first to the fifth possible implementations of the first aspect, in a sixth possible implementation, the policy rule decision entity is an operation support system/business support system OSS/BSS; and the policy rule execution entity is a network functions virtualization orchestrator NFVO, a network functions virtualization manager (VNFM), or a virtualized infrastructure manager (VIM).

According to a second aspect, a policy rule execution entity is provided. The policy rule execution entity includes a communications interface and a processor, where the communications interface is configured to receive a network functions virtualization management and orchestration NFV MANO operation request sent by a policy rule decision entity, where the NFV MANO operation request includes a policy parameter; and the processor is configured to: obtain a policy descriptor file corresponding to the NFV MANO operation request, where the policy descriptor file includes at least one piece of policy information corresponding to the NFV MANO operation request; and configure the policy parameter into the policy information to form a policy rule.

With reference to the second aspect, in a first possible implementation, the policy information includes at least one of an event monitored according to the policy rule, a condition for executing the policy rule, and an action executed according to the policy rule.

With reference to the second aspect or the first possible implementation of the second aspect, in a second possible implementation, the processor is configured to: determine an operational attribute of the NFV MANO operation request; and obtain, from a catalog or from a set of policy descriptor files that is stored on the policy rule execution entity, the policy descriptor file corresponding to the operational attribute.

With reference to the second aspect or the first possible implementation of the second aspect, in a third possible implementation, the processor is configured to: obtain an identifier of the policy descriptor file from the NFV MANO operation request; and obtain, from a catalog, the policy descriptor file corresponding to the identifier of the policy descriptor file.

With reference to any one of the second aspect or the first to the third possible implementations of the second aspect, in a fourth possible implementation, the processor is further configured to: receive request information for updating the policy rule, where the request information includes the identifier of the policy descriptor file used by the policy rule and an updated policy parameter; obtain, according to the identifier of the policy descriptor file, the policy descriptor file used by the policy rule; and configure the updated policy parameter into the policy descriptor file to form an updated policy rule.

With reference to any one of the second aspect or the first to the fourth possible implementations of the second aspect, in a fifth possible implementation, the NFV MANO operation request includes at least one of: network service NS life cycle management, virtualized network function VNF life cycle management and virtual resource management, NS instantiation, NS updating, NS scaling, NS healing, NS termination, VNF instantiation, VNF updating, VNF scaling, VNF healing, VNF termination, virtual resource reservation, and virtual resource allocation.

With reference to any one of the second aspect or the first to the fifth possible implementations of the second aspect, in a sixth possible implementation, the policy rule decision entity is an operation support system/business support system OSS/BSS.

According to a third aspect, an NFV MANO policy descriptor management system is provided. The system includes the policy rule execution entity and the policy rule decision entity according to any one of the possible implementations of the second aspect.

With reference to the third aspect, in a first possible implementation, the policy rule execution entity is a network functions virtualization orchestrator (NFVO), a network functions virtualization manager (VNFM), or a virtualized infrastructure manager (VIM).

With reference to the third aspect or the first possible implementation of the third aspect, in a second possible implementation, the policy rule decision entity is a policy management function entity (PMF), and the PMF is configured to create, delete, and modify a policy rule.

With reference to the second possible implementation of the second aspect, in a third possible implementation, the PMF is located on an NFVO layer or an OSS/BSS layer.

With reference to the second or the third possible implementation of the third aspect, in a fourth possible implementation, the PMF is a separate manager or a manager that has an Internet protocol (IP) address the same as that of the NFVO.

With reference to any one of the third aspect or the first to the fourth possible implementations of the third aspect, in a fifth possible implementation, the system further includes a catalog, and the catalog stores the policy descriptor file.

According to a fourth aspect, a computer readable storage medium is provided. The computer readable storage medium stores program code for implementing the NFV MANO policy descriptor management method described in the first aspect, and the program code includes an execution instruction for running the NFV MANO policy descriptor management method described in the first aspect.

According to the method and apparatus provided in embodiments of the present invention, normalized policy descriptor file template processing (that is, each category of operation corresponds to one policy descriptor file) is performed on thousands of or tens of thousands of NFV MANO policy rules based on the categories of the NFV MANO operations, and in a network service or VNF life cycle management process, the policy information in the policy descriptor file is filled by using a specific parameter value carried in commands exchanged between MANO management entities, to form a policy rule actually used in the life cycle management process, thereby improving the NFV MANO policy management efficiency.

DESCRIPTION OF EMBODIMENTS

Embodiment 1

Figure 1:
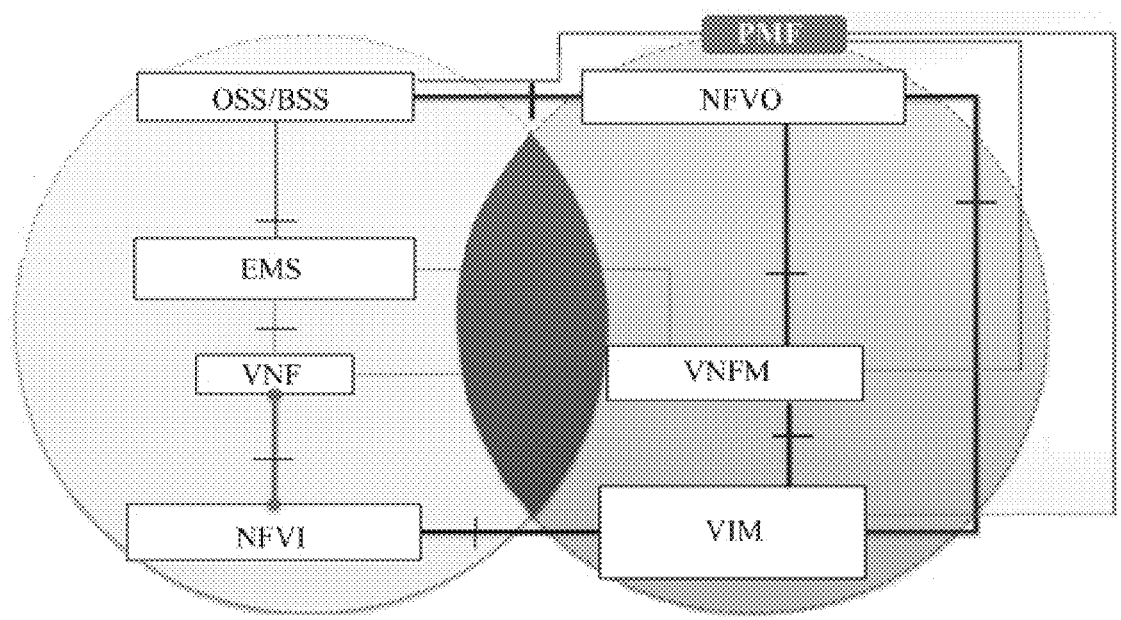
FIG. 1 is a schematic structural diagram of an NFV MANO policy descriptor management system according to an embodiment of the present invention.

A method and an apparatus provided in this embodiment of the present invention are applied to an NFV system. This embodiment of the present invention provides an NFV MANO policy descriptor management system. As shown in FIG. 1, the NFV MANO policy descriptor management system includes: an operation support system/business support system (OSS/BSS), an element management system (EMS), a virtualized network function (VNF), a network functions virtualization infrastructure (NFVI), and network function virtualization—multi-input/multi-output (NFV-MIMO). NFV MANO includes a network functions virtualization orchestrator (NFVO), a virtualized network function manager (VNFM), a virtualized infrastructure manager (VIM), and a policy management function (PMF) entity.

Primarily oriented to telecommunications service operators, the OSS/BSS provides an integrated network management and service operation function, including network management (for example, fault monitoring and network information collection), charging management, and customer service management.

The EMS may be configured to manage one or more VNFs, and mainly perform a conventional fault management, configuration management, charging management, performance management, and security management (FCAPS) function for the VNF.

The VNF corresponds to a physical network function (PNF) in a conventional non-virtualized network, for example, a virtualized evolved packet core (EPC) node. The virtualized EPC node includes: a mobility management entity (MME), a serving gateway (SGW), a packet data network gateway (PGW), and the like. A functional behavior and status of a network are unrelated to whether the network is virtualized. In an NFV system, a VNF and a PNF have a same functional behavior and external interface.

A virtualization layer in the NFVI is used to: abstract a hardware resource in a hardware resource layer, and decouple the VNF from a physical layer to which the hardware resource belongs, to provide a virtual resource for the VNF.

The virtual resource layer may include virtual computing, virtual storage, and a virtual network. The virtual computing and the virtual storage may be provided for the VNF in a form of a virtual machine or another virtual container. For example, one or more virtual machines form a VNF. The virtualization layer forms the virtual network by abstracting network hardware. The virtual network is used to implement communication between a plurality of virtual machines, or between a plurality of other types of virtual containers carrying the VNF. The virtual network may be created by using technologies such as a virtual LAN (VLAN), a virtual private LAN service (VPLS), a virtual extensible local area network (VxLAN), or network virtualization using generic routing encapsulation (NVGRE).

The NFVO implements management and processing of an NSD and a virtualized network function forwarding graph (VNFFG), and network service life cycle management, and implements life cycle management of the VNF and overview functions of resources in cooperation with the VNFM.

The VNFM implements life cycle management of virtualized network elements VNFs, including VNFD management and processing, VNF instance initialization, VNF scale-in/scale-out, and VNF instance termination, supports receiving of a scaling policy delivered by the NFVO, and implements scaling of the VNF.

The VIM is mainly responsible for management, monitoring, and fault reporting of an infrastructure-layer hardware resource and a virtualized resource, and providing a virtualized resource pool for an upper-layer application.

Figure 2:
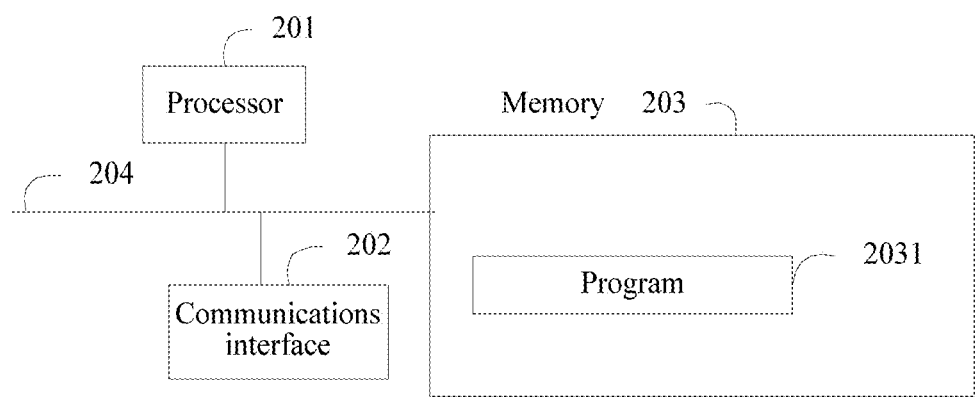
FIG. 2 is a schematic structural diagram of a policy rule execution entity according to an embodiment of the present invention.

In this embodiment of the present invention, the PMF is a new logical function entity that is defined in a MANO architecture and that is configured to centrally manage NFV MANO policies. Optionally, the PMF reuses policy management functions of policy rule creation, deletion, and modification in the prior art (for example, the PMF may reuse a ZOOM (Zero-touch Orchestration, Operations and Management) policy model proposed in a telecom management forum (TMF). In a scenario in which PMF functions are deployed in an NFV MANO architecture, a MANO management entity (network functions virtualization orchestrator (NFVO)/virtualized network function manager (VNFM)/virtualized infrastructure manager (VIM)) maintains only a policy execution function. A position of the PMF in the MANO architecture is shown in FIG. 2.

The PMF function is located on an NFVO layer, or may be further elevated to an OSS/BSS layer, and the PMF function physically may be a separate manager or a manager co-located with the NFVO (that is, having a same IP address). The PMF has a feature of a domain. A policy management domain of the PMF is the same as an NFVO domain, or a policy management domain of the PMF covers a plurality of NFVO domains.

Policy management reference points are separately defined between the PMF and the OSS/BSS, between the PMF and the VNFM, and between the PMF and the VIM. If the PMF physically is a separate manager, a policy management reference point is also defined between the PMF and the NFVO. At each reference point related to the PMF (for example, Os-Ma-Pmf, Pmf-Vnfm, Pmf-Vi, and Pmf-Nfvo), a provider provides functions of creating, deleting, and modifying a policy rule for a consumer.

In this embodiment, a memory for data storage may include the following four storage libraries:

an NS catalog: including all loaded NSDs;

a VNF catalog: including all loaded VNF packages;

NFV instances: including all running network service instances and VNF instances; and NFVI resources: including NFVI resources in all states, available/reserved/allocated NFVI resources.

Embodiment 2

As shown in FIG. 2, with reference to Embodiment 1, this embodiment of the present invention provides a policy rule execution entity. Based on the system framework provided in Embodiment 1, the policy rule execution entity may be any one of the NFVO, the VNFM, or the VIM in Embodiment 1. The policy rule execution entity may include at least one processor 201 (for example, a CPU), a communications interface 202 (the communications interface may be at least one network interface or an interface of another type), a memory 203, and at least one communications bus 204 that is configured to implement communication connection between the apparatuses. The processor 201 is configured to execute an executable module, for example, a computer program, stored in the memory 203. The memory 203 may include a high-speed random access memory (RAM), or may further include a non-volatile memory, for example, at least one magnetic disk storage. Communication connection between this system gateway and at least one other network element is implemented by using the at least one communications interface 202 (which may be wired or wireless), and Internet, a wide area network, a local network, a metropolitan area network, and the like may be used.

In some implementations, the memory stores a program 2031, and the program may be executed by the processor to implement various functions of the processor. An implementation is as follows.

The communications interface 202 is configured to receive a network functions virtualization management and orchestration NFV MANO operation request sent by a policy rule decision entity, where the NFV MANO operation request includes a policy parameter.

The NFV MANO operation request includes at least one of: network service NS life cycle management, virtualized network function VNF life cycle management and virtual resource management, NS instantiation, NS updating, NS scaling, NS healing, NS termination, VNF instantiation, VNF updating, VNF scaling, VNF healing, VNF termination, virtual resource reservation, and virtual resource allocation.

The processor 201 is configured to: obtain a policy descriptor file corresponding to an NFV MANO operation requested by the NFV MANO operation request, where the policy descriptor file includes at least one piece of policy information corresponding to the NFV MANO operation; and configure the policy parameter into the policy information to form a policy rule.

The policy information includes at least one of an event monitored according to the policy rule, a condition for executing the policy rule, and an action executed according to the policy rule.

Optionally, there are a plurality of implementations for the processor 201 to obtain the policy descriptor file corresponding to the NFV MANO operation request, and two optimal manners are provided below:

The processor 201 is configured to: determine an operational attribute of the NFV MANO operation request; and obtain, from a catalog or from a set of policy descriptor files that is stored on the policy rule execution entity, the policy descriptor file corresponding to the operational attribute.

The processor 201 is configured to: obtain an identifier of the policy descriptor file from the NFV MANO operation request; and obtain, from a catalog, the policy descriptor file corresponding to the identifier of the policy descriptor file.

Optionally, to simplify a policy rule updating procedure, the processor 201 is further configured to: receive request information for updating the policy rule, where the request information includes the identifier of the policy descriptor file used by the policy rule and an updated policy parameter; obtain, according to the identifier of the policy descriptor file, the policy descriptor file used by the policy rule; and configure the updated policy parameter into the policy descriptor file to form an updated policy rule.

Optionally, when the solution provided in this embodiment of the present invention is used, the policy rule decision entity is an operation support system/service support system OSS/BSS or a policy management function entity (PMF).

The apparatus provided in this embodiment of the present invention performs category-based normalization management on a large quantity of NFV MANO policy rules by using a template policy descriptor file, determines the policy information of the policy rule, and may further fill, in a network service or VNF life cycle management process, the policy information of the policy descriptor file by using a specific parameter carried in commands exchanged between MANO management entities, to form a policy rule actually used in the NS or VNF life cycle management process, thereby improving NFV MANO policy management efficiency.

In addition, during actual application, when some particular policy rules need to be updated, by using the apparatus provided in the foregoing embodiment, the particular policy rules can be pertinently updated and there is no need to re-generate all policy rules corresponding to an entire descriptor file, so that a policy rule formation procedure can be simplified, and a requirement for real-time adjustment of the policy rule can be met.

Embodiment 3

Figure 3:
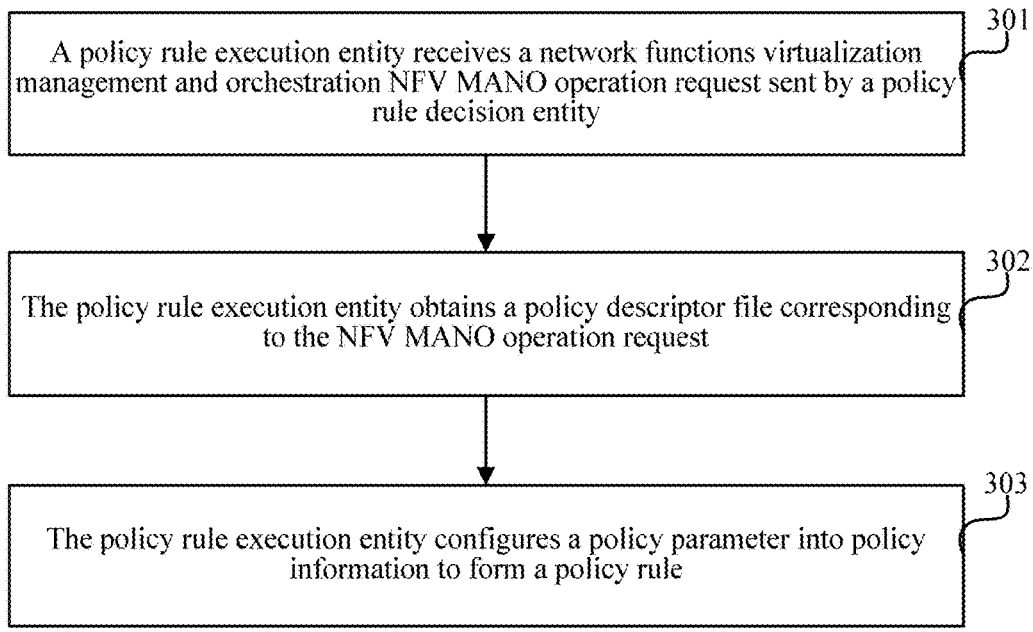
FIG. 3 is a schematic flowchart of an NFV MANO policy descriptor management method according to an embodiment of the present invention.

As shown in FIG. 3, based on the system framework provided in Embodiment 1, an NFV MANO policy descriptor management method provided in this embodiment of the present invention is further described in detail below with reference to the accompanying drawings of this specification. The method includes the following operations.

Operation 301. A policy rule execution entity receives a network functions virtualization management and orchestration NFV MANO operation request sent by a policy rule decision entity, where the NFV MANO operation request includes a policy parameter.

With reference to the system framework provided in Embodiment 1, the policy rule execution entity may be any one of the NFVO, the VNFM, or the VIM in Embodiment 1, and the policy rule decision entity may be an OSS/BSS or a PMF.

In this embodiment, the NFV MANO operation includes: network service NS life cycle management, virtualized network function VNF life cycle management and virtual resource management, NS instantiation, NS updating, NS scaling, NS healing, NS termination, VNF instantiation, VNF updating, VNF scaling, VNF healing, VNF termination, virtual resource reservation, and virtual resource allocation.

Operation 302. The policy rule execution entity obtains a policy descriptor file corresponding to the NFV MANO operation request, where the policy descriptor file includes at least one piece of policy information corresponding to an NFV MANO operation requested by the NFV MANO operation request.

In addition, the policy descriptor file includes the at least one piece of policy information corresponding to the NFV MANO operation. The policy information may be policy rule metadata, and at least one piece of policy information in a same policy descriptor file includes one of or a combination of an event monitored according to the policy rule, a condition for executing the policy rule, and an action executed according to the policy rule that are to be determined for a same NFV MANO operation. The event monitored according to the policy rule, the condition for executing the policy rule, and the action executed according to the policy rule may be as follows respectively:

If a policy descriptor file 1 corresponds to a network service scaling operation, the policy descriptor file includes at least one piece of policy information corresponding to NS scaling, for example:

the event monitored according to the policy rule: performance parameters, for example, CPU usage, of virtual resources used by a VNF indicator forming the NS and a VNF forming the NS;

the condition for executing the policy rule: a threshold that corresponds to the event monitored according to the policy and that is used for condition comparison, for example, a threshold value corresponding to the central processing unit (CPU) usage; and the action executed according to the policy rule: an NFV MANO operation performed when the CPU usage is greater than or less than the threshold value in the condition. For example, when the CPU usage is greater than or equal to the threshold value, a scale-out operation is performed, or when the CPU usage is less than the threshold value, no operation is performed or a scale-in operation is performed.

A policy descriptor file 2 corresponds to a VNF healing operation, and a policy descriptor file 3 is bound to a virtual resource allocation operation. Correspondingly, if the NFV MANO operation initiated by the policy rule decision entity is performed to implement a network service scaling operation, the policy descriptor file 1 is correspondingly obtained.

Operation 303. The policy rule execution entity configures the policy parameter into the policy information to form a policy rule.

In this embodiment, the policy descriptor file includes only a framework structure forming the policy rule, that is, the policy information, and a specific policy rule is not formed. A complete policy rule can be formed only after a parameter value is obtained from an input parameter of the NFV MANO operation request and the parameter value is combined with the policy information. For example, a implementation of forming a policy rule for condition-based determining may be as follows:

the policy information is a condition expression, and a corresponding parameter value is a threshold value that is used for condition comparison when determining is performed by using the condition expression.

Figure 4:
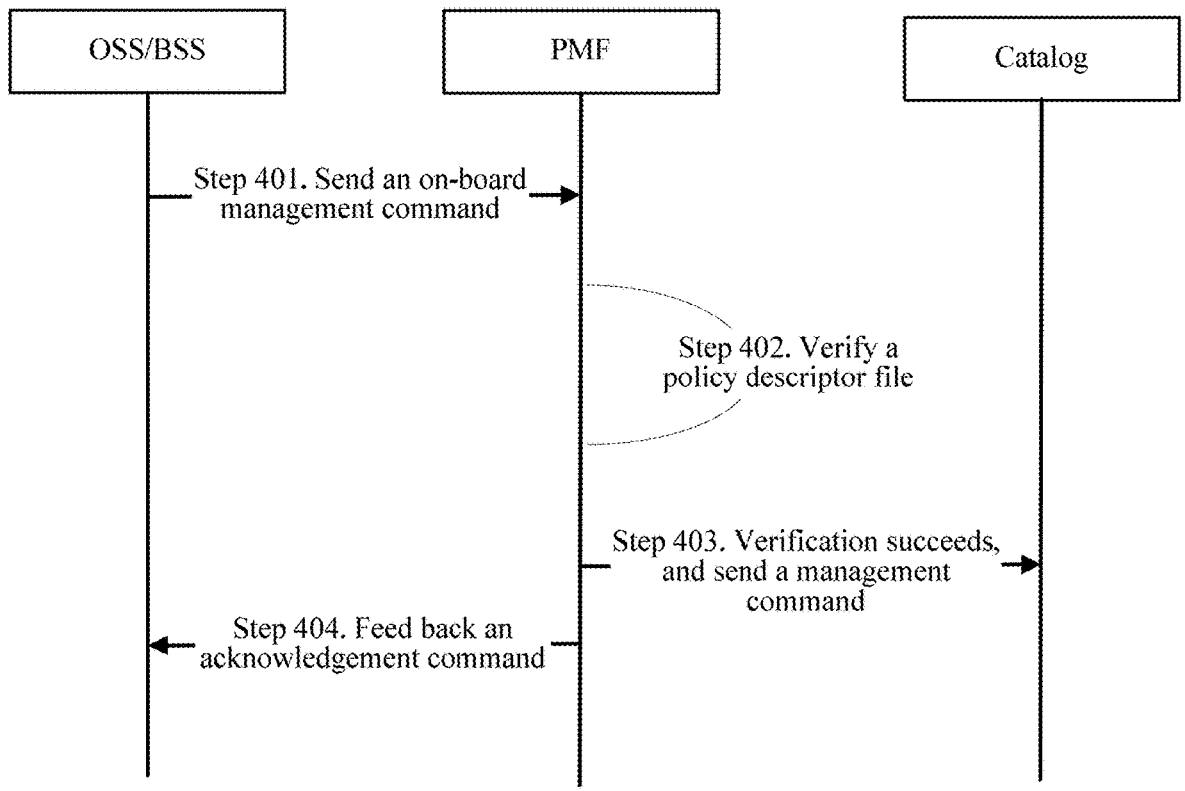
FIG. 4 is a schematic flowchart of an on-board process of a policy descriptor file according to an embodiment of the present invention.

Based on the system structure in Embodiment 1, before the policy descriptor file is obtained, a implementation of an on-board process of the policy descriptor file in this embodiment of the present invention may include the following operations (an implementation process is shown in FIG. 4).

Operation 401. An OSS/BSS locally creates and generates a policy descriptor file for a category of NFV MANO operation, and sends an on-board policy descriptor management command to a PMF, to instruct the PMF to complete an on-board process of the policy descriptor file.

Operation 402. After receiving the on-board policy descriptor command, the PMF verifies the policy descriptor file in aspects such as authentication and authorization.

Operation 403. If the PMF determines that verification on the policy descriptor file succeeds and the policy descriptor file can be on board, the PMF sends a notify catalog management command to a catalog, and puts the policy descriptor on board and stores the policy descriptor into the catalog. The catalog is a database that is located on a PMF layer and that is used to store the policy descriptor file.

Operation 404. The PMF further returns an on-board policy descriptor acknowledgement command to the OSS/BSS, to notify the OSS/BSS that the policy descriptor file is on board.

After the policy descriptor file is on board and stored in the catalog, the policy rule execution entity may obtain the policy descriptor file corresponding to the NFV MANO operation in a plurality of manners. Two optimal implementations are provided below:

Manner 1: A corresponding policy descriptor file is obtained by using an operational attribute of the NFV MANO operation. A implementation may be:

determining, by the policy rule execution entity, the operational attribute of the NFV MANO operation request; and obtaining, by the policy rule execution entity from the catalog or from a set of policy descriptor files that is stored on the policy rule execution entity, the policy descriptor file corresponding to the operational attribute.

For example, the policy descriptor file 1 corresponds to a network service scaling operation, the policy descriptor file 2 corresponds to a VNF healing operation, and the policy descriptor file 3 corresponds to a virtual resource allocation operation; and correspondingly, if the policy rule execution entity determines that an operational attribute of a received NFV MANO operation is to implement the network service scaling operation, correspondingly, the policy descriptor file 1 is obtained as a first policy descriptor file.

Manner 2: A correspondence between the policy descriptor file and an identifier of the policy descriptor file is established, and the corresponding policy descriptor file is obtained by using the correspondence. A implementation may be:

obtaining, by the policy rule execution entity, the identifier of the policy descriptor file from the NFV MANO operation request; and obtaining, by the policy rule execution entity from the catalog, the policy descriptor file corresponding to the identifier of the policy descriptor file.

When the solution in this embodiment of the present invention is implemented through interaction between the OSS/BSS and the NFVO, a implementation of this embodiment may be as follows:

In a process in which the OSS/BSS initiates an NS life cycle management (NS LCM) operation to the NFVO, the OSS/BSS adds the identifier of the policy descriptor file corresponding to the NS LCM operation to an operation request message.

If the NS LCM operation does not carry the identifier of the policy descriptor file, it is considered by default that the NFVO may directly select the corresponding policy descriptor file from the catalog according to the NS LCM operation command.

For example, a policy descriptor file identifier corresponding to the policy descriptor file 1 is 001, a policy descriptor file identifier corresponding to the policy descriptor file 2 is 002, and a policy descriptor file identifier corresponding to the policy descriptor file 3 is 003.

Corresponding, if an identifier obtained by the policy rule execution entity from a received NFV MANO operation is 002, the policy descriptor file 2 may be obtained as a first policy descriptor file by using the identifier of the policy descriptor file.

Figure 5:
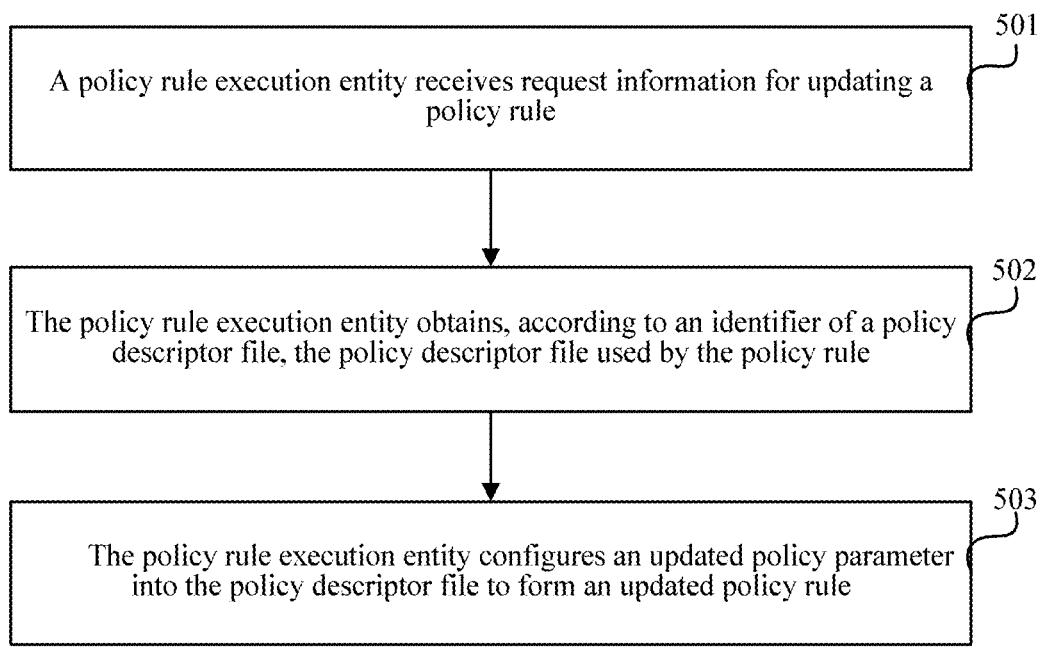
FIG. 5 is a schematic flowchart of a policy rule updating process according to an embodiment of the present invention.

Optionally, the foregoing manner is a implementation process when the policy rule is generated at the first time. However, in an implementation environment, not all policy rules in the policy descriptor file need to be re-generated each time. Therefore, to simplify a policy rule updating procedure, in the method provided in this embodiment of the present invention, a policy rule needing to be adjusted may be updated. Because in this embodiment of the present invention, the policy rule is generated by combining the policy information (in other words, an architecture of the policy rule) and a parameter value (a specific parameter of the policy rule), an implementation of updating a policy rule may be as follows: First, a policy descriptor file in which a to-be-updated policy rule is located is determined; then, policy information corresponding to the to-be-updated policy rule is obtained from the policy descriptor file; and finally a new policy rule may be formed by combining the policy information and a to-be-updated parameter value. An implementation operations may be as follows (as shown in FIG. 5):

Operation 501. The policy rule execution entity receives request information for updating the policy rule, where the request information includes an identifier of a policy descriptor file used by the policy rule and an updated policy parameter.

Operation 502. The policy rule execution entity obtains, according to the identifier of the policy descriptor file, the policy descriptor file used by the policy rule.

Operation 503. The policy rule execution entity configures the updated policy parameter into the policy descriptor file to form an updated policy rule.

To pertinently update a particular policy rule, rather than updating an entire policy descriptor file, when the updated policy parameter is configured into the policy descriptor file to form the updated policy rule, an implementation may be:

obtaining, from the policy descriptor file, the policy information corresponding to the policy rule, and filling the policy information by using an updated parameter value, to generate the updated policy rule.

According to the method provided in this embodiment of the present invention, category-based normalization management is performed on a large quantity of NFV MANO policy rules by using a template policy descriptor file, the policy information of the policy rule is determined, and further, in a network service or VNF life cycle management process, the policy information of the policy descriptor file may be filled by using a specific parameter carried in commands exchanged between MANO management entities, to form a policy rule actually used in the NS or VNF life cycle management process, thereby improving NFV MANO policy management efficiency.

In addition, during actual application, when some particular policy rules need to be updated, by using the method provided in the foregoing embodiment, the particular policy rules can be pertinently updated and there is no need to re-generate all policy rules corresponding to an entire descriptor file, so that a policy rule formation procedure can be simplified, and a requirement for real-time adjustment of the policy rule can be met.

The foregoing one or more technical solutions in the embodiments of this application have at least the following technical effects:

According to the method and apparatus provided in the embodiments of the present invention, normalized policy descriptor file template processing is performed on thousands of or tens of thousands of NFV MANO policy rules based on the categories of the NFV MANO operations, and in the network service or VNF life cycle management process, the policy information in the policy descriptor file is filled by using a specific parameter value carried in commands exchanged between MANO management entities, to form a policy rule actually used in the life cycle management process, thereby improving the NFV MANO policy management efficiency.

In addition, an implementation of dynamically updating one or more policy rules based on the policy descriptor file is further provided, so that a policy rule updating and management procedure is simplified.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, persons skilled in the art can make various modifications and variations to the present invention without departing from and scope of the present invention. The present invention is intended to cover these modifications and variations provided that they fall within the scope of protection defined by the following claims and their equivalent technologies.

What is claimed is:

1. A network functions virtualization management and orchestration (NFV MANO) policy descriptor management method, comprising:

receiving, by a policy rule execution entity, a network functions virtualization management and orchestration (NFV MANO) operation request sent by a policy rule decision entity, wherein the NFV MANO operation request comprises a policy parameter;

obtaining, by the policy rule execution entity, a policy descriptor file corresponding to the NFV MANO operation request, wherein the policy descriptor file comprises at least one piece of policy information corresponding to an NFV MANO operation requested by the NFV MANO operation request; and configuring, by the policy rule execution entity, the policy parameter into the policy information to form a policy rule.

2. The method according to claim 1, wherein the policy information comprises at least one of an event monitored according to the policy rule, a condition for executing the policy rule, or an action executed according to the policy rule.

3. The method according to claim 1, wherein the obtaining the policy descriptor file corresponding to the NFV MANO operation request comprises:

determining, by the policy rule execution entity, an operational attribute of an NFV MANO operation requested by the NFV MANO operation request; and obtaining, by the policy rule execution entity from a catalog or from a set of policy descriptor files that is stored on the policy rule execution entity, the policy descriptor file corresponding to the operational attribute.

4. The method according to claim 1, wherein the obtaining the policy descriptor file corresponding to the NFV MANO operation request comprises:

obtaining, by the policy rule execution entity, an identifier of the policy descriptor file from the NFV MANO operation request; and obtaining, by the policy rule execution entity from a catalog, the policy descriptor file corresponding to the identifier of the policy descriptor file.

5. The method according to claim 1, wherein the method further comprises:

receiving, by the policy rule execution entity, request information for updating the policy rule, wherein the request information comprises the identifier of the policy descriptor file used by the policy rule and an updated policy parameter;

obtaining, by the policy rule execution entity according to the identifier of the policy descriptor file, the policy descriptor file used by the policy rule; and configuring, by the policy rule execution entity, the updated policy parameter into the policy descriptor file to form an updated policy rule.

6. The method according to claim 1, wherein the NFV MANO operation comprises at least one of: network service (NS) life cycle management, virtualized network function (VNF) life cycle management and virtual resource management, NS instantiation, NS updating, NS scaling, NS healing, NS termination, VNF instantiation, VNF updating, VNF scaling, VNF healing, VNF termination, virtual resource reservation, or virtual resource allocation.

7. The method according to claim 1, wherein the policy rule decision entity is an operation support system/service support system (OSS/BSS); and the policy rule execution entity is a network functions virtualization orchestrator (NFVO), a network functions virtualization manager (VNFM), or a virtualized infrastructure manager (VIM).

8. A policy rule execution entity, comprising a communications interface and a processor, wherein the communications interface is configured to receive a network functions virtualization management and orchestration (NFV MANO) operation request sent by a policy rule decision entity, wherein the NFV MANO operation request comprises a policy parameter; and the processor is configured to: obtain a policy descriptor file corresponding to an NFV MANO operation requested by the NFV MANO operation request, wherein the policy descriptor file comprises at least one piece of policy information corresponding to the NFV MANO operation; and configure the policy parameter into the policy information to form a policy rule.

9. The policy rule execution entity according to claim 8, wherein the policy information comprises at least one of an event monitored according to the policy rule, a condition for executing the policy rule, or an action executed according to the policy rule.

10. The policy rule execution entity according to claim 8, wherein the processor is configured to: determine an operational attribute of the NFV MANO operation; and obtain, from a catalog or from a set of policy descriptor files that is stored on the policy rule execution entity, the policy descriptor file corresponding to the operational attribute.

11. The policy rule execution entity according to claim 8, wherein the processor is configured to: obtain an identifier of the policy descriptor file from the NFV MANO operation request; and obtain, from a catalog, the policy descriptor file corresponding to the identifier of the policy descriptor file.

12. The policy rule execution entity according to claim 8, wherein the processor is further configured to: receive request information for updating the policy rule, wherein the request information comprises the identifier of the policy descriptor file used by the policy rule and an updated policy parameter; obtain, according to the identifier of the policy descriptor file, the policy descriptor file used by the policy rule; and configure the updated policy parameter into the policy descriptor file to form an updated policy rule.

13. The policy rule execution entity according to claim 8, wherein the NFV MANO operation comprises at least one of: network service NS life cycle management, virtualized network function (VNF) life cycle management and virtual resource management, NS instantiation, NS updating, NS scaling, NS healing, NS termination, VNF instantiation, VNF updating, VNF scaling, VNF healing, VNF termination, virtual resource reservation, and virtual resource allocation.

14. The policy rule execution entity according to claim 8, wherein the policy rule decision entity is an operation support system/service support system (OSS/BSS).

15. An NFV MANO policy descriptor management system, comprising a policy rule execution entity and a policy rule decision entity, wherein the policy rule execution entity comprises a communications interface and a processor, the communications interface is configured to receive a network functions virtualization management and orchestration (NFV MANO) operation request sent by the policy rule decision entity, wherein the NFV MANO operation request comprises a policy parameter; and the processor is configured to: obtain a policy descriptor file corresponding to an NFV MANO operation requested by the NFV MANO operation request, wherein the policy descriptor file comprises at least one piece of policy information corresponding to the NFV MANO operation; and configure the policy parameter into the policy information to form a policy rule.

16. The NFV MANO policy descriptor management system according to claim 15, wherein the policy rule execution entity is a network functions virtualization orchestrator (NFVO), a network functions virtualization manager (VNFM), or a virtualized infrastructure manager (VIM).

17. The NFV MANO policy descriptor management system according to claim 15, wherein the policy rule decision entity is a policy management function (PMF) entity, and the PMF is configured to create, delete, and modify a policy rule.

18. The NFV MANO policy descriptor management system according to claim 17, wherein the PMF is located on an NFVO layer or an OSS/BSS layer.

19. The NFV MANO policy descriptor management system according to claim 17, wherein the PMF is a separate manager or a manager that has an IP address the same as that of the NFVO.

20. The NFV MANO policy descriptor management system according to claim 15, wherein the system further comprises a catalog, and the catalog stores the policy descriptor file.

* * * * *